(12) United States Patent  
Tsukagoshi

(10) Patent No.: US 7,411,736 B2
(45) Date of Patent: Aug. 12, 2008

(54) IMAGE DETECTION METHOD AND IMAGE DETECTING APPARATUS

(75) Inventor: Takuya Tsukagoshi, Sagamihara (JP)

(73) Assignee: Olympus Corporation, Tokyo (JP)

( * ) Notice: Subject to any disclaimer, the term of this patent is extended or adjusted under 35 U.S.C. 154(b) by 37 days.

(21) Appl. No.: 11/649,424

(22) Filed: Jan. 3, 2007

(65) Prior Publication Data

US 2007/0171536 A1 Jul. 26, 2007

(30) Foreign Application Priority Data

Jan. 20, 2006 (JP) .............................. 2006-012424

(51) Int. Cl.
G02B 1/00 (2006.01)
G02B 15/14 (2006.01)
G02B 9/00 (2006.01)
G06K 9/32 (2006.01)
G09G 5/00 (2006.01)

(52) U.S. Cl. .................. 359/642; 359/676; 359/754; 382/299; 345/625

(58) Field of Classification Search .......... 345/613, 345/621, 625; 359/618, 629, 642, 656, 676, 359/754; 382/299
See application file for complete search history.

(56) References Cited

U.S. PATENT DOCUMENTS 5,680,200 A * 10/1997 Sugaya et al. ............... 355/53
6,717,736 B1 * 4/2004 Hill ............................ 359/629
7,218,190 B2 * 5/2007 Engheta et al. ............. 333/239
2007/0046525 A1 * 3/2007 Holbrook et al. ............ 342/22
2007/0268600 A1 * 11/2007 Tsukagoshi ................. 359/754

OTHER PUBLICATIONS

V. G. Veselago et al., Soviet Physics USPEKHI 10, 509-514 (1968).
E. Heckt, "Optics", 4th ed. 471-474 (Addison-Wesley, Reading, MA., 2002).
J. B. Pendry, Physical Review Letters 85, 3966-3969 (2000).
D. R. Smith et al., Physical Review Letters 84, 4184-4187 (2000).
M. Notomi, Physical Review B 62, 10696-10705 (2000).
P. M. Valanju et al. Physical Review Letters 88, 187401 (2002).
D. Schurig et al., Physical Review E 70, 065601 (2004).
D. R. Smith et al., Applied Physics Letters 82, 1506-1508 (2003).
J. Tsujiuchi et al., Handbook of Advanced Optical Technologies (Asakura Shoten, 2002) with English translation of Figure 1.5.2 (Page 194).
J. B. Pendry, Science 306, 1353-1355 (2004).
S. A. Ramakrishna et al., Physical Review B 69, 115115 (2004).
K. Inoue et al., "Photonic Crystals", 236-239, 252-259 (Springer-Verlag, 2004).

* cited by examiner

*Primary Examiner*—David N Spector
(74) *Attorney, Agent, or Firm*—Kenyon & Kenyon LLP

(57) ABSTRACT

An image detection method includes steps of transferring image information in which, information of an object image on a sample (object plane) is transferred to a detection plane (image plane) of an imaging element via an optical system which includes a negative refraction lens formed of a material exhibiting negative refraction, detecting image in which, image-plane image information transferred to the detection plane (image plane) of the imaging device is detected optically, and calculation processing in which, for the image-plane image information which is detected, information of the object image is calculated by performing a calculation processing based on optical characteristics of the optical system.

7 Claims, 12 Drawing Sheets

IMAGE DETECTION METHOD AND IMAGE DETECTING APPARATUS

CROSS-REFERENCE TO RELATED APPLICATION

The present application is based upon and claims the benefit of priority from the prior Japanese Patent Application No. 2006-012424 filed on Jan. 20, 2006; the entire contents of which are incorporated herein by reference.

BACKGROUND OF THE INVENTION

1. Field of the Invention

The present invention relates to a method of detecting an image by using an imaging optical system such as a microscope, a camera, and an endoscope, and an apparatus which detects an image by using an imaging optical system such as a microscope, a camera, and an endoscope.

2. Description of the Related Art

In recent years, resolution of an image detecting apparatus in which an imaging optical system such as a microscope, a camera, and an endoscope is used has been improved. Particularly, in a field of microscopes and optical recording, an almost no aberration optical system has been realized, and a resolution as an imaging optical system has been constrained mainly by a diffraction limit of a visible light. On the other hand, as it has been disclosed in the following Non-Patent Literatures, an optical material in which a refractive index takes a negative value (hereinafter, called appropriately as "negative refraction material") has been realized. It has been proposed that when the negative refraction material is used, it is possible to form an image having a very high resolution beyond the diffraction limit (hereinafter, called appropriately as "perfect imaging").

As it has been disclosed in Non-Patent Literature Physical Review Letters, Volume 85, Page 3966 (2000), by J. B. Pendry, even in a case other than a case in which the refractive index takes a negative value, when a real part of a dielectric constant or a magnetic permeability is a negative value, for electromagnetic waves of a specific polarization state, the negative refraction phenomenon is observed. Moreover, as it has been disclosed in Non-Patent Literature Physical Review B, Volume 62, Page 10696 (2000), by M. Notomi, in a periodic structure such as a photonic crystal, as a result of a photonic band being turned up in a reciprocal lattice space, irrespective of being a material having each of the refractive index, the dielectric constant, and the magnetic permeability a positive value, a negative refraction phenomenon has been observed for electromagnetic waves of a specific wavelength and a specific polarization state.

In view of the abovementioned circumstances, in this specification, a material which exhibits a negative refraction response for specific electromagnetic waves is called as a "material exhibiting negative refraction". It is needless to mention that an expression "material exhibiting negative refraction" is a concept having a wide sense than the negative refraction material.

Apart from the photonic crystals mentioned above, materials such as metallic thin films, chiral substances, photonic crystals, metamaterials, left-handed materials, backward wave materials, and negative phase velocity media have been known as the materials exhibiting negative refraction.

According to Non-Patent Literature Soviet Physics USPEKHI, Volume 10, Page 509 (1968), by V. G. Velelago et al., for a material having a negative value for both the dielectric constant and the magnetic permeability, the refractive index is also a negative value. Furthermore, it has been shown that such materials satisfy sort of like extension of Snell's law, which will be described later.

FIG. 9 shows a refraction of light in a general optical material (hereinafter, called appropriately as a "general optical material") having a positive refractive index. When light is propagated from a medium 1 to a medium 2, the light is refracted at an interface of the two media. In this case, the Snell's law indicated by the following equation (1) is satisfied.

$$n_1 \sin\theta_1 = n_1 \sin\theta_2 \quad \text{equation (1)}$$

Here, $\theta_1$ denotes an angle of incidence, $\theta_2$ denotes an angle of refraction, $n_1$ denotes a refractive index of the medium 1, and $n_2$ denotes a refractive index of the medium 2.

FIG. 10 shows a refraction of light when the refractive index $n_2$ of the medium 2 takes a negative value. As shown in FIG. 10, light which is incident is refracted in a direction opposite to a direction of refraction shown in FIG. 9, with respect to a normal of the interface. In this case, when the angle of refraction $\theta_2$ is let to be a negative value, the equation satisfies the Snell's law mentioned above.

FIG. 11 shows an image forming relationship by a convex lens 13 in which a general optical material is used. Light from an object point 11A on an object plane 11 is focused at an image point 12A on an image plane 12. When the refractive index of the lens is positive, it is necessary that a lens surface has a finite curvature for image forming.

Whereas, a flat plate made of a material exhibiting negative refraction (hereinafter, called appropriately as "negative refraction lens") can focus the light irrespective of the curvature being infinite. FIG. 12 shows an image formation relationship by a negative refraction lens 14. Light from an object point 11B on the object plane 11 is focused at an image point 12B on the image plane 12.

In an image forming optical system such as a microscope, an upper limit value of a theoretical resolution is determined by a diffraction limit. As it has been described in a textbook of optics such as Non-Patent Literature "Optics", 4th edition (Addison-Wesley, Reading, Mass., 2002) by E. Hecht, according to Rayleigh criterion, a minimum distance between two resolvable points is $\lambda/NA$. Here, $\lambda$ is a wavelength, and NA is the numerical aperture. Moreover, a structure smaller than the diffraction limit can not be resolved by an optical system.

Moreover, a microscope and an optical pickup which improve the resolution by using an objective lens such as a liquid-immersion objective lens, an oil-immersion objective lens, and a solid immersion objective lens, has been proposed. An effective NA is increased in these. Accordingly, a value of $\lambda/NA$ equivalent to the diffraction limit is reduced. Here, the numerical aperture NA cannot be greater than a refractive index of a medium in which the object plane is disposed. Therefore, an upper limit for the numerical aperture NA is about 1.5 to 2.0.

Light which is emitted from the object point 11A on the object plane 11 forms two types of light waves namely propagating light which reaches up to a far distance and evanescent waves which are attenuated at a distance of about a wavelength from the object point 11A. The propagating light corresponds to a low-frequency component out of information on the object plane 11. The evanescent waves on the other hand, correspond to a high-frequency component out of the information on the object plane 11.

A boundary between the propagating light and the evanescent waves is a spatial frequency equivalent to $1/\lambda$. Particularly, a spatial frequency in the object plane of the evanescent waves is higher than 1/λ. Therefore, a wave number component of the evanescent waves in a direction of propagation of light perpendicular to the object plane is an imaginary number. Therefore, the evanescent waves are attenuated rapidly as they are receded from the object plane 11.

Regarding the propagating light on the other hand, not all the components are advanced to an optical system. A part of the propagating light is eclipsed by an aperture in the optical system. Therefore, only a component of the spatial frequency on the object plane 11, which is smaller than NA/λ reaches the image plane 12. Ultimately, from information which reaches the image point 12A, the high-frequency component out of the information held by the object point 11A is missing. Accordingly, there is a spread of a point image due to diffraction, and the resolution is constrained.

In Non-Patent Literature Physical Review Letters, Volume 85, Page 3966 (2000)), by J. B. Pendry, which was disclosed in recent years, an amplification of the evanescent waves mentioned above in the negative refraction material has been disclosed. Therefore, it is shown that, in the image formation by the negative refraction lens 14 shown in FIG. 12, the amplitude of the evanescent waves on the image plane 12 is restored to the same quantity as on the object plane 11. In other words, in an optical system shown in FIG. 12, both the propagating light and the evanescent waves are transferred from the object plane 11 to the image plane 12. Therefore, information of the object point 11B is reproduced perfectly at the image point 12B. This means that when an image forming optical system in which the negative refraction lens 14 is used, the perfect imaging in which the resolution is not limited by the diffraction limit, is possible.

The perfect imaging mentioned above is not true only in theoretical terms. A negative refraction lens has been made, and results of experiments have been reported. For example, in Non-Patent Literature Physical Review Letters, Volume 84, Page 4184 (2000)), by D. R. Smith et al., a metamaterial in which a rod and a coil made of a metal, smaller than the wavelength are arranged periodically, has been made. Functioning of such metamaterial as a negative refraction lens in a microwave region has been reported.

Moreover, in Non-Patent Literature Physical Review B, Volume 62, Page 10696 (2000)), by M. Notomi, a method of making a negative refraction material by using a photonic crystal has been disclosed. In a photonic crystal in which air rods are arranged in a hexagonal lattice form, in a dielectric substance, a photonic band in which an effective refractive index is isotropic and negative exists. Furthermore, it is possible to consider the photonic crystal as a two-dimensional homogeneous negative refraction material with respect to electromagnetic waves in a frequency band which is accommodated in the photonic band.

For the perfect imaging by the negative refraction lens, there is a theoretical counterargument in a Non-Patent Literature Physical Review Letters, Volume 88, Page 187401 (2002)), by P. M. Valanju et al., which has lead to a controversy. However, in recent years, a theory of the negative refraction lens disclosed in Non-Patent Literature Physical Review Letters, Volume 85, Page 3966 (2000) by J. B. Pendry, has been generally accepted.

In an optical system in which a general optical material is used, it is possible to make an aplanatic point, in other words, a point at which a spherical aberration and a coma aberration become zero simultaneously. An image formed by this optical system invariably becomes an imaginary image. Therefore, when the negative refraction material is used, it is possible to form a real image by disposing an object plane at the aplanatic point (refer to Non-Patent Literature Physical review E, Volume 70, page 065601 (2004) by D. Schurig et al.). Thus, by using the negative refraction material, it is possible to perform a unique optical designing which has not been there so far.

Moreover, it has been known that for many metals, a real part of a dielectric constant for (with respect to) a visible light becomes negative. For example, according to Non-Patent Literature "Handbook of Advanced Optical Technologies" by J. Tsujiuchi et al., (published by Asakura Shoten, Japan 2002), silver exhibits a negative dielectric constant for light of a wavelength in a range of 330 nm to 900 nm. Furthermore, according to Non-Patent Literature, Science, Volume 306, Page 1353 (2004), by J. B. Pendry even in a chiral substance having a helical structure, there exists a photonic band exhibiting a negative refraction.

A phenomenon of negative refraction has unique characteristics differing from characteristics of a general optical material, such as having a negative angle of refraction, having a phase velocity and a group velocity in opposite directions, and that an electric field, a magnetic field, and a pointing vector form a left hand system in this order.

A name of a material which exhibits negative refraction has not yet been established in general. Therefore, under the characteristics mentioned above, such materials are sometimes called as "negative phase velocity materials", "left handed materials", "backward wave materials", and "negative refraction materials". In this specification, such material is treated as a type of a material which exhibits negative refraction. Such treatment is not at all contradictory considering a definition of the material exhibiting negative refraction.

Moreover, there are many phenomenon names which overlap with a name under (of) a material or a structure. For example, a metamaterials made of a metal resonator array are sometimes called as left-handed substances or left-handed metamaterials. These are also let to be included in the materials exhibiting negative refraction.

Thus, when a negative refraction lens formed by a negative refraction material is used, it is possible to realize an image forming optical system of a very high resolution (perfect imaging) in which the diffraction limit is not constrained (refer to Non-Patent Literature Physical Review Letters, Volume 85, Page 3966 (2000) by J. B. Pendry, for example). Furthermore, even in a case of image formation of only the propagating light, it is possible to have a unique optical designing (refer to Non-Patent Literature Physical Review E, Volume 70, Page 065601 (2004) by D. Schurig et al., for example).

However, for realizing the perfect imaging by the negative refraction lens, an absolute value of the refractive index of the negative refraction lens and an absolute value of a refractive index of a medium in which an object plane (image plane) is disposed have to be the exactly the same. When the absolute values of the refractive index differ slightly, or when there is a slight imaginary component in the refractive index of the negative refraction lens, the restoring of the evanescent waves is inhibited, and the image formation efficiency is declined.

According to Non-Patent Literature Applied Physical Letters, Volume 82, Page 1506 (2003) by D. R. Smith et al. for example, a resolution of the refraction lens having a refractive index −1.0+0.001i disposed in air (refractive index=1) is about twelve times of the diffraction limit. Moreover, when the refractive index of the negative refraction lens is −1.1+ 0.001i, evanescent waves up to about eight times of the diffraction limit, reach an image plane. However, evanescent waves of which frequencies are slightly higher than the evanescent waves up to about twelve times or eight times of the diffraction limit, are amplified resonantly. Due to such resonant enhancement, a favorable image formation performance cannot be achieved.

Next, a transfer function which is an index showing a resolution of an optical system will be described below. An amplitude distribution of light on an object plane is expressed by the following equation (2). An intensity distribution of light on the object plane is expressed by the following equation (3).

$$A(x) = A_0 \cos(kx) \quad \text{equation (2)}$$

$$I(x) = A_0^2 \cos^2(kx) = (A_0^2/2)\{1 + \cos(kx/2)\} \quad \text{equation (3)}$$

Here, A denotes an amplitude on the object plane
$A_0$ denotes a maximum amplitude on the object plane
k denotes a wave number
A' denotes an amplitude on an image plane
$A'_0$ denotes a maximum amplitude on the image plane An object which has the abovementioned amplitude and the intensity distribution is formed as an image (subjected to image formation) by a predetermined optical system. At this time, an amplitude distribution and an intensity distribution on the image plane are expressed by the following equation (5) respectively. Here, β is a lateral magnification of the optical system.

$$A'(x) = A'_0 \cos(\beta kx) \quad \text{equation (4)}$$

$$I'(x) = A'_0{}^2 \cos^2(kx) = (A'_0{}^2/2)\{\beta kx/2)\} \quad \text{equation (5)}$$

In a real optical system, equation (4) and equation (5) take different function form due to an effect of scattering and interference of light. In this case, the intensity distribution which is observed actually may be subjected to Fourier transform, and a component of a spatial frequency βk may be extracted. A ratio of amplitudes $A'_0/A_0$ and a ratio of intensities $A'_0{}^2/A_0{}^2$ obtained in such manner are let to be called as an amplitude transfer function and an intensity transfer function respectively.

In a case when it is not necessary to distinguish the amplitude and the intensity, the two ratios mentioned above are called only as a transfer function. Moreover, in this specification, calling as "transfer function", it includes both the amplitude transfer function and the intensity transfer function.

Thus, a transfer function which is peculiar to the optical system is called only as "transfer function". Furthermore, a transfer function upon being subjected to compensating calculation process which will be described later is called as "compensated transfer function (transfer function compensation)". Such a "compensated transfer function" is a concept of calculation processing, and is a state in which a characteristic curve of an original transfer function of the optical system is not changed by the calculation processing, and is in an original state.

When the transfer function (frequency dependence) in an image forming optical system in general is measured, the transfer function is declined rapidly near a spatial frequency equivalent to a resolution limit. Therefore, a structure which is smaller than the spatial frequency equivalent to the resolution limit cannot be resolved.

Moreover, in optical systems including an optical element which is formed by a material exhibiting negative refraction, since the resonant enhancement of the evanescent waves described above inhibits an image formation of a low frequency component carried by the propagating light, in addition to the smaller structure than the spatial frequency equivalent to the resolution limit, it is all the more damaging.

SUMMARY OF THE INVENTION

The present invention is made in view of the abovementioned circumstances, and an object of the present invention is to provide an image detection method in which an effect of a resonant enhancement of evanescent waves is reduced in an optical system including an optical element formed of a material exhibiting negative refraction.

According to the present invention it is possible to provide an image detection method which includes steps of transferring image information in which, information of an image on an object plane (hereinafter called appropriately as "object image") is transferred to an image plane via an optical system which includes an optical element formed by a material exhibiting negative refraction, detecting image in which, an image information transferred to the image plane (hereinafter, called appropriately as "image-plane image information") is detected optically, and calculation processing in which, for the image-plane image information which is detected, information of the object image is calculated by performing a calculation processing based on optical characteristics of the optical system.

Moreover, according another aspect of the present invention, it is possible to provide an image detecting apparatus which includes an optical system which has an optical element formed of a material exhibiting negative refraction, an imaging section which detects optically image-plane image information on the image plane of the optical system, and a calculation processing section which performs calculation processing of the image-plane image information which is detected by the imaging section, according to the image detection method.

The optical system transfers information of an object image on an object plane to an image plane.

DETAILED DESCRIPTION OF THE INVENTION

Embodiments of an image detection method and an image detecting apparatus according to the present invention will be described in detail with reference to the accompanying diagrams. However, the present invention is not restricted by these embodiments.

First Embodiment

Figure 1:
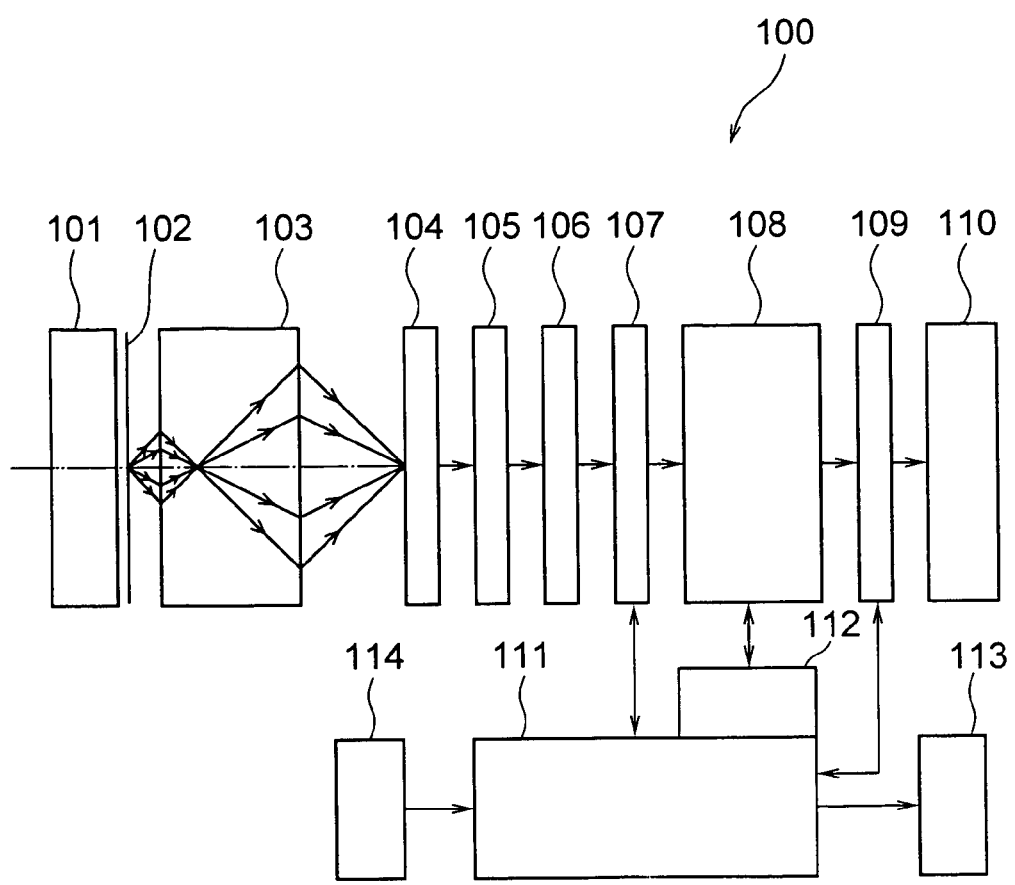
FIG. 1 is a diagram showing a schematic structure of an image detecting apparatus according to a first embodiment of the present invention.

FIG. 1 shows a schematic structure of an image detecting apparatus 100 according to the present invention. A sample 102 is fixed on a sample stage 101. The sample 102 corresponds to an object plane. Light from the sample 102 is incident on a negative refraction lens 103.

The negative refraction lens 103 is formed by a flat plate made of a material exhibiting negative refraction. As it has been mentioned above, apart from photonic crystals mentioned above, materials such as metallic thin films, chiral substances, photonic crystals, metamaterials, left-handed materials, backward wave materials, and negative phase velocity media (materials) can be used as the material exhibiting negative refraction. The light from the sample 102 is passed through the negative refraction lens 103, and is transferred optically to a detection plane of an imaging device 104. This corresponds to a step of transferring image information. Moreover, a CCD (charge coupled device) can be used as the imaging device 104. The imaging device 104 is disposed such that an image plane and the detection plane of the imaging device 104 coincide mutually. The detection by the imaging device 104 corresponds to a step of detecting image.

An operation of the imaging device 104 is controlled by an imaging process circuit 105. Image information detected by the imaging device 104 is quantized by an A/D converter 106. Information which is quantized is stored temporarily in a frame memory 107. A RAM (random access memory) for example, can be used as the frame memory 107.

A transfer function compensating circuit 108 performs a compensation process on the quantized information. An operation algorithm of the transfer function compensating circuit 108 will be described later. The compensated image information is encoded by an encoding control circuit 112. Encoded information is stored in a memory card 110 via a memory interface 109. A system control circuit 111 has a function of controlling these all operations. The system control circuit 111 is also provided with information processing functions for a display device 113 and an operation device 114. The display device 113, for example, is a liquid crystal display (LCD) which displays the image information recorded in the memory card 110 as visual information. The operation device 114 is a device for operating a calculation processing by an operator, which will be described later.

Figure 2:
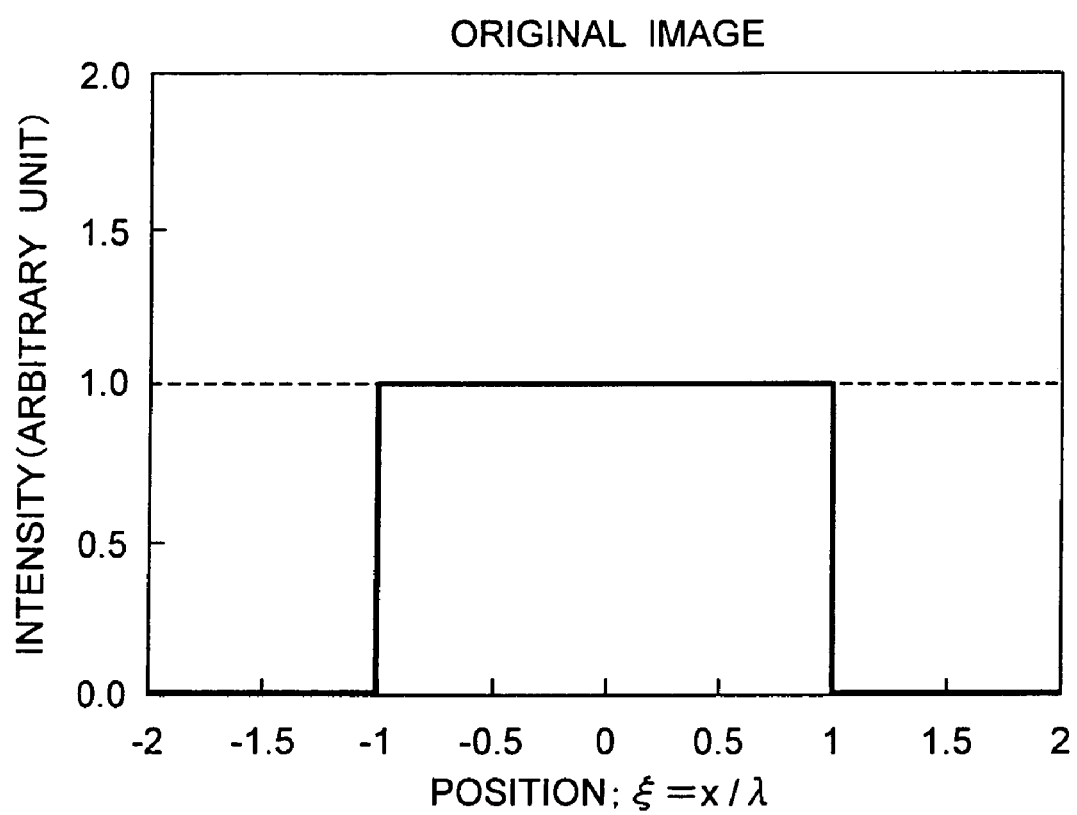
FIG. 2 is a diagram showing a one-dimensional rectangular intensity distribution, as optical information on an object plane.

Next, the operation algorithm of the transfer function compensating circuit 108 will be described below. As the sample 102, in other words, as optical information (original image) on the object plane, a one-dimensional rectangular intensity distribution as shown in FIG. 2 is used. Moreover, any two-dimensional intensity distribution on the object plane can be resolved into set of plane wave component by performing a two-dimensional Fourier transform. Accordingly, it is needless to mention that an effect of the present invention which is derived for the one-dimensional rectangular intensity distribution is valid for a sample having the two-dimensional intensity distribution.

A width direction of the one-dimensional rectangular intensity distribution is let to be an x axis and a direction orthogonal to the x axis on the object plane is let to be a y axis. An actual length x is normalized by a wavelength $\lambda$ of light contributing to image formation, and $\xi$ is let to be $\xi=x/\lambda$. Moreover, a wave number $k_0$ equivalent to diffraction limit is let to be $k_0 \equiv 2\pi/\lambda$. Moreover, an actual wave number k is also normalized by $k_0$, and $\kappa$ is let to be $\kappa \equiv k/k_0$.

Moreover, when a one-dimensional rectangular amplitude distribution is let to be g(x) and a Fourier transform thereof is let to be G(x), relationship indicated by the following equation (6) and equation (7) is established between g(x) and G(x).

$$g(x) = \frac{1}{\sqrt{2\pi}} \int_{-\infty}^{\infty} G(k)\exp(ikx)dk \quad \text{equation (6)}$$

$$G(k) = \frac{1}{\sqrt{2\pi}} \int_{-\infty}^{\infty} g(x)\exp(-ikx)dx \quad \text{equation (7)}$$

When equation (6) and equation (7) are rewritten in terms of $\xi$ and $\kappa$, the following equation (8) and equation (9) are obtained.

$$f(\xi)=\int_{-\infty}^{\infty} F(\kappa)\exp(2\pi i\kappa\xi)d\kappa \quad \text{equation (8)}$$

$$F(\kappa)=\int_{-\infty}^{\infty} f(\xi)\exp(-2\pi i\kappa\xi)d\xi \quad \text{equation (9)}$$

Here, equation (6) to equation (9), are equations of complex numbers for convenience for purely mathematical reason. For finding the actual amplitude distribution, a real part of functions such as f, F, g, and G may be calculated.

In a case of the one-dimensional rectangular intensity distribution shown in FIG. 2, the amplitude distribution is obtained by the following equation (10).

$$f(\xi) = \begin{cases} 1 & (|\xi| \leq 1) \\ 0 & (|\xi| > 1) \end{cases} \quad \text{equation (10)}$$

Moreover, the Fourier transform of equation (10) is as in the following equation (11).

$$F(\kappa)\int_{-1}^{1}\exp(-2\pi i\kappa\xi)d\xi = \frac{\sin(2\pi\kappa)}{\pi\kappa} \quad \text{equation (11)}$$

Taking into consideration that F($\kappa$) is a real number and an even function, when equation (11) is substituted in equation (8), and an integral is expressed as a sum upon digitizing (performing a discretization) $\kappa$, a relation in the following equation (12) is obtained.

$$f(\xi) = \sum_{j=0}^{\infty} F_j \cos(2\pi\kappa_j\xi) \quad \text{equation (12)}$$

$$F_0 = 2\Delta\kappa, \quad F_j = \frac{2\Delta\kappa}{\pi\kappa_j}\sin(2\pi\kappa_j) \text{ (when } j \neq 0)$$

Here, $\Delta\kappa$ is a discrete interval when K is digitized, and in the first embodiment, $\Delta\kappa$ is let to be 0.1 ($\Delta\kappa=0.1$). Moreover, in equation (12), an infinite series of j is taken. However, it may be substituted by a sum of up to j=200. This is equivalent to executing integration in a range of κ=−20 to +20 in an original integral.

Figure 3:
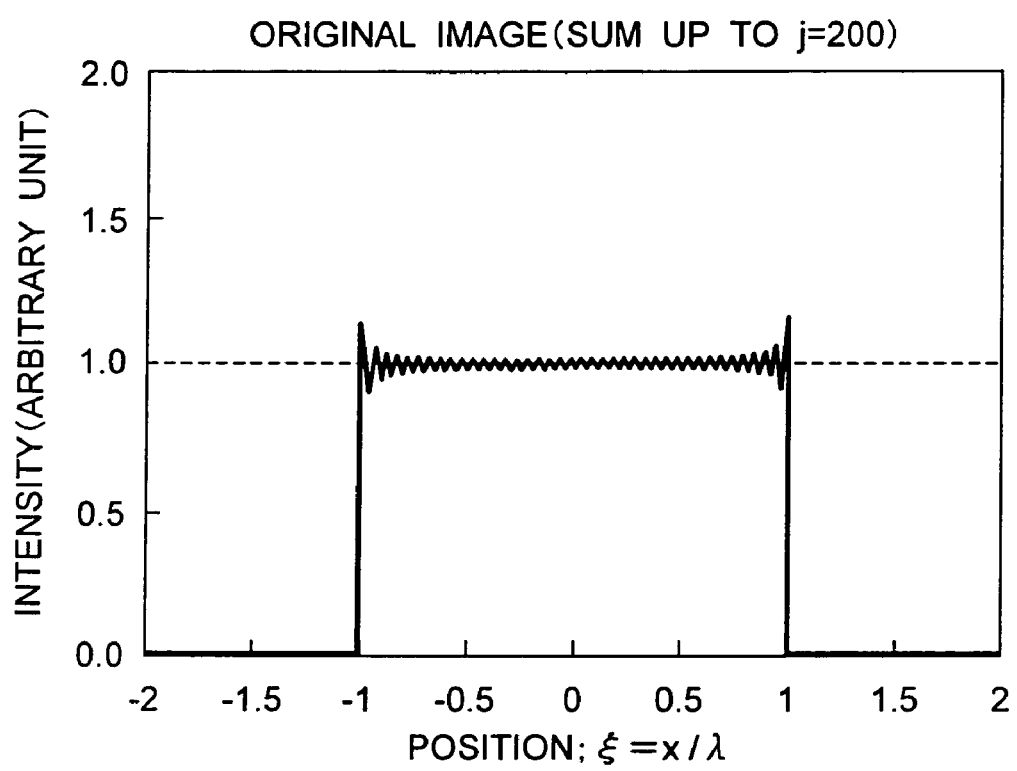
FIG. 3 is a diagram showing an intensity distribution in which an amplitude distribution in which a sum of up to j=200 is squared, for the one-dimensional rectangular intensity distribution.

A result obtained by squaring the amplitude distribution in which the sum of up to j=200 in equation (12) is taken, and letting it to be the intensity distribution, is shown in FIG. 3. In normal circumstances, it has to show a distribution same as the distribution shown in FIG. 2. However, as an effect of terminating the infinite series at j=200, a vibration pattern has appeared at both ends of the rectangular form. A calculation of compensation of the transfer function which will be described later, which is performed in the first embodiment, corresponds to a case not in FIG. 2 but in FIG. 3, in which the intensity distribution is disposed on the object plane.

Here, a case in which a detection plane (image plane) of the imaging device 104 and the sample 101 (object plane) are in air is taken into consideration. Therefore, according to Non-Patent Literature by Physical Review Letters, Volume 85, Page 3966 (2000), J. B. Pendry, a condition for the negative refraction lens 103 to realize a perfect imaging is that a ratio of refractive index of the negative refraction lens 103 with respect to a refractive index of air is −1, and that there is no absorption in the negative refraction lens 103.

Figure 4:
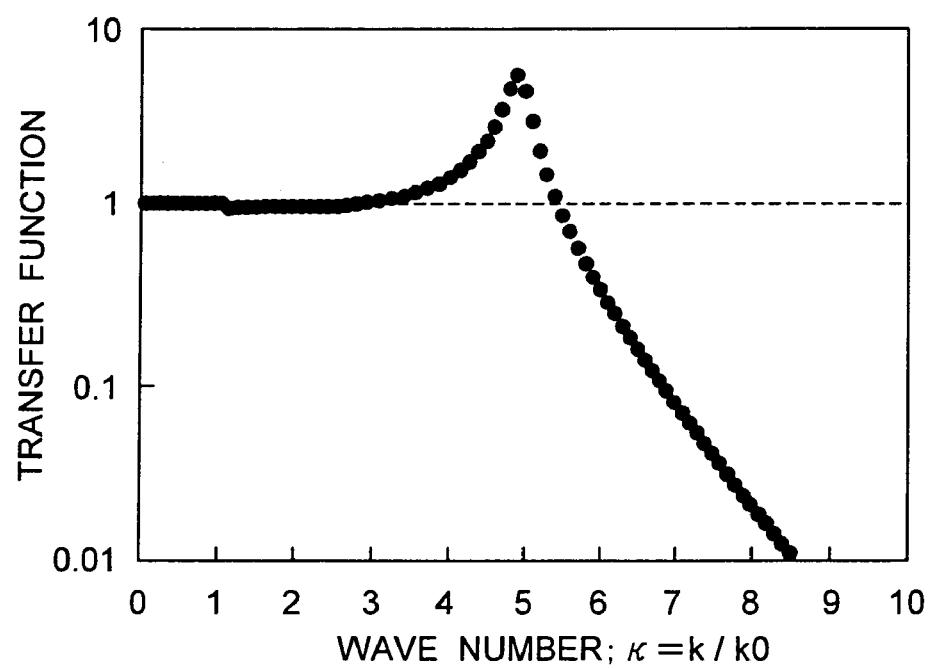
FIG. 4 is a diagram showing a transfer function of a negative refraction lens.

Whereas, in the first embodiment, a dielectric constant of the negative refraction lens is let to be −1.1+0.01i. When converted to the refractive index, this is approximately −1.2 +0.004i. Here, according to Non-Patent Literature Applied Physical Letters, Volume 82, Page 1506 (2003), by D. R. Smith et al., a relationship between a normalized spatial frequency κ, and a transfer function |τ(κ)| from the sample 101 (object plane) to the detection plane (image plane) of the imaging device 104 via the negative refraction lens 103 is as shown in FIG. 4.

Here, the transfer function, as it has been described above, is defined as the ratio of the amplitudes $A'_0/A_0$ or the ratio of the intensities $A'_0{}^2/A_0{}^2$, in equation (2) to equation (5).

In a case of a conventional general optical system, since the light becomes evanescent waves in a region of κ>1, the transfer function also is attenuated. Whereas, in FIG. 4 the transfer function maintains a value of 1 or more than 1 from κ up to about 5.5. This shows that the evanescent waves are amplified by the negative refraction lens 103. When a wavelength of light in vacuum, which is used for image detection is let to be λ, and a refractive index n of a medium which fills an emergence side of the object plane is let to be n, it may be a case in which a value of the transfer function for the spatial frequency n/λ is more than 1. Furthermore, when it is let to have a light source for illuminating the object plane, and when a wavelength of light emerged from the light source is let to be λ', it may by a case in which a value of the transfer function for the spatial frequency n/λ' is more than 1.

In a case of a negative refraction lens which satisfies conditions of perfect imaging, the transfer function is always 1 irrespective of the value of κ. Actually, as shown in FIG. 4, according to an effect of an amount of shift (mismatch) of the refractive index from −1, and the absorption, the transfer function is attenuated in a region of κ>5.5. Moreover, a resonant enhancement of the transfer function occurs near κ=4.8. The resonant enhancement causes a damaging effect to the image formation.

Figure 5:
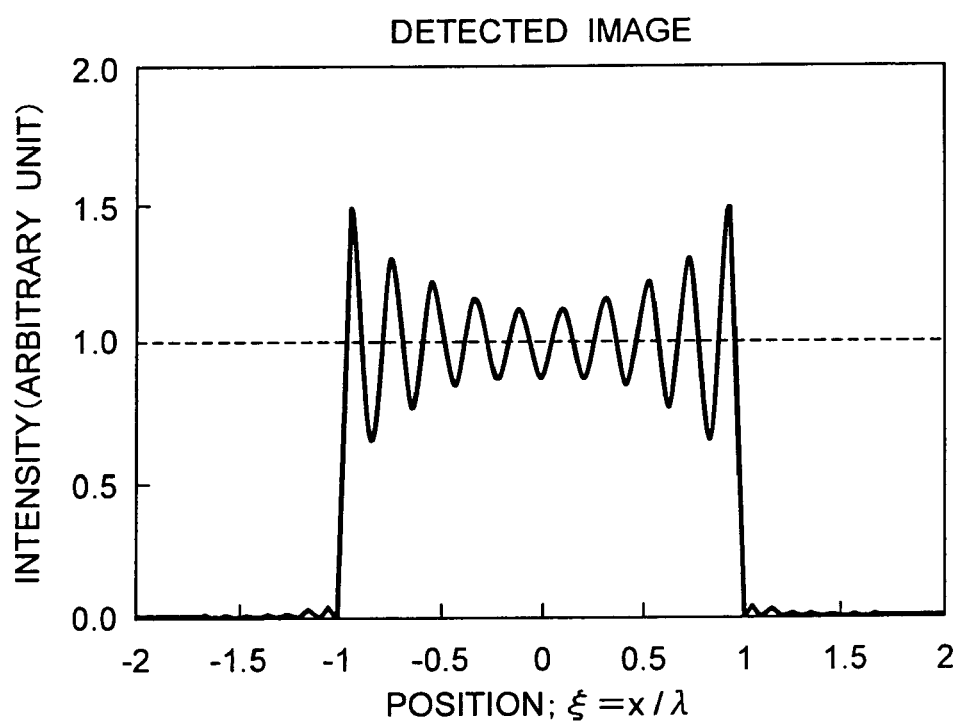
FIG. 5 is a diagram showing an intensity distribution on an image plane.

FIG. 5 is a diagram in which an intensity distribution on the detection plane (image plane) of the imaging device 104 is calculated when the intensity distribution shown in FIG. 3 is transferred by a negative refraction lens having a transfer function in FIG. 4. A concrete method for calculation will be described below.

When an image formation is performed by the negative refraction lens having the transfer function |τ(κ)|, for an amplitude distribution f(ξ) for which the sum of up to 200 is taken for j in equation (12), the amplitude distribution on the image plane is given by the following equation (13).

$$f_{img}(\xi) = \sum_{j=0}^{200} |\tau(\kappa_j)| F_j \exp(2\pi i \kappa_j \xi) \qquad \text{equation (13)}$$

Figure 6:
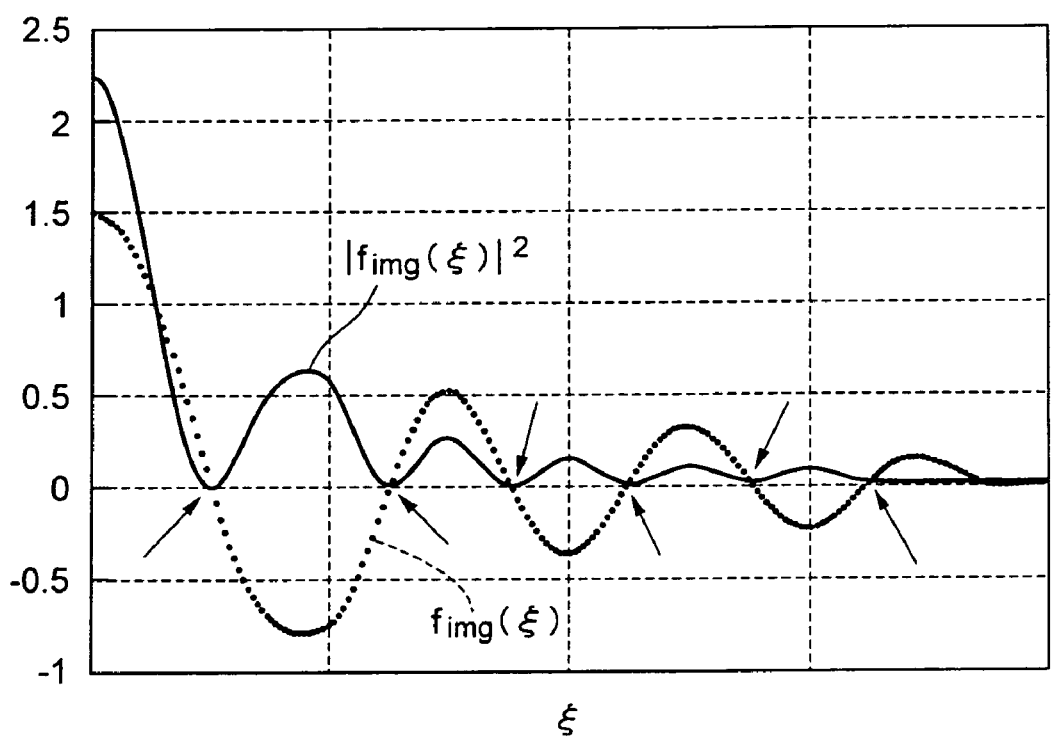
FIG. 6 is a diagram in which a square of an absolute value of $f_{img}$ is plotted against ξ, for explaining a process of detecting a zero point from image information which is detected.

FIG. 6 is a diagram in which a square of an absolute value of $f_{img}$ calculated in equation (13) is plotted against ξ. The curve is substantially distorted as compared to the original intensity distribution disposed in the sample 102 (object plane). Moreover, it can be noticed that the distortion is a vibration component of a high frequency as compared to a rectangular width, and that frequency is near κ=4.8 which gives the resonant enhancement in FIG. 4.

Next, a method of reproducing an image close to an original (image) by performing the transfer function compensation on the intensity distribution which is detected at the detection plane (image plane) of the imaging device 104 will be described below. At the image plane, an electric signal proportional to the intensity distribution $|f_{img}(\xi)|^2$ of light wave is detected. A square root of the electric signal is calculated and let to be the amplitude distribution $f_{img}(\xi)$.

Here, $f_{img}(\xi)$ may take any of a positive and a negative value. Therefore, a zero point of the intensity distribution $|f^{img}(\xi)|^2$ is detected. Next, an operation of inverting a sign of $f_{img}(\xi)$ is performed in the vicinity of zero point.

FIG. 6 shows an example of the intensity distribution $|f^{img}(\xi)|^2$ and the amplitude distribution $f_{img}(\xi)$. In FIG. 6, a point indicated by an arrow mark corresponds to the zero point. It is possible to calculate directly the transfer characteristics based on a theoretical value of the negative refraction lens 103. In such a case, the calculation process may be performed by using the intensity distribution instead of the amplitude distribution.

The present invention is targeted for a system in which the perfect imaging is not realized by a mismatch of the refractive index of the negative refraction lens 103 and a finite absorption ratio. Therefore, although a fineness of the image formation is beyond the diffraction limit, a frequency component which can be transmitted to the image plane is limited.

Consequently, the intensity distribution $|f_{img}(\xi)|^2$ of light wave on the image plane is formed by a finite frequency component. Moreover, it is possible to detect that zero point in reality. In the actual image detecting apparatus 100, it is desirable to take into consideration quantitatively, a noise caused by an optical system, such as a flare and a scattering, and a noise caused by a thermal fluctuation and a dark current of the imaging device 104. Further, it is preferable to detect the zero point by providing a fixed threshold value for the electric signal which is detected.

The Fourier transform for the amplitude distribution $f_{img}(\xi)$ which is detected in such manner, can be indicated by the following equation (14).

$$F_{img}(\kappa) = \sum_{j=0}^{M} f_j \cos(2\pi \kappa \xi_j) \qquad \text{equation (14)}$$

-continued $$f_j \equiv \begin{cases} \Delta\xi f_{img}(0) \ldots (j = 0) \\ 2\Delta\xi f_{img}(\xi_j) \ldots (j \neq 0) \end{cases}$$

Here, $\Delta\xi$ is a discrete interval when $\xi$ is digitized, and an integral is replaced by the sum for j. Here, $\Delta\xi$ is let to be 0.01 ($\Delta\xi$=0.01). Moreover, M is a maximum value (number of terms in Fourier series) of j at which the infinite series is terminated half way. Here, M is let to be 200 (M=200).

In other words, an integral range of the Fourier transform is equivalent to performing in a range of $\xi$=−2 to +2. Looking at the intensity distribution in FIG. 5, it is evident that this range is a sufficient integral range. While performing the image detection and the transfer function compensation practically, the intensity distribution $|f_{img}(\xi)|^2$ is distributed over various ranges. Therefore, it is preferable to perform a setting such that a product of the discrete interval $\Delta\xi$ and the number of terms M is substantially large, taking into consideration the distribution range of the intensity distribution which may be detected. Moreover, when the discrete interval $\Delta\xi$ and the number of terms M are determined according to an image which is detected, not only an accuracy of the transfer function compensation but also an optimum operation including an amount of calculation required for the image detection and compensation becomes possible, and hence it is more preferable.

When the Fourier transform $f_{img}(\kappa)$ is calculated from the intensity distribution which is detected, by calculation shown in equation (14), it is possible to calculate a restored amplitude distribution $f_{cmp}(\xi)$ by equation (15).

$$f_{cmp}(\xi) = \int_{-\infty}^{\infty} \frac{F_{img}(\kappa)}{|\tau(\kappa)|} \exp(2\pi i\kappa\xi) d\kappa \quad \text{equation (15)}$$

Next, a reason why the restored amplitude distribution $f_{cmp}(\xi)$ is (to be) calculated by equation (15) will be described below. An amplitude distribution $f(\xi)$ on the sample 101 (object plane) shown in FIG. 3 is formed as an image (subjected to image formation) on the detection plane (image plane) of the imaging device 104 by the negative refraction lens 103. At this time, the negative refraction lens 103 has the transfer function $|\tau(\kappa)|$ shown in FIG. 4.

The amplitude distribution when an image is formed on the image plane 102 by the negative refraction lens 103 having such transfer function $|\tau(\kappa)|$ is $f_{img}(\xi)$ shown in FIG. 5. Consequently, next, conversely, when $1/|\tau(\kappa)|$ times of each Fourier component of $f_{img}(\xi)$ is integrated for $\kappa$, the original amplitude distribution $f(\xi)$ can be restored.

Figure 7:
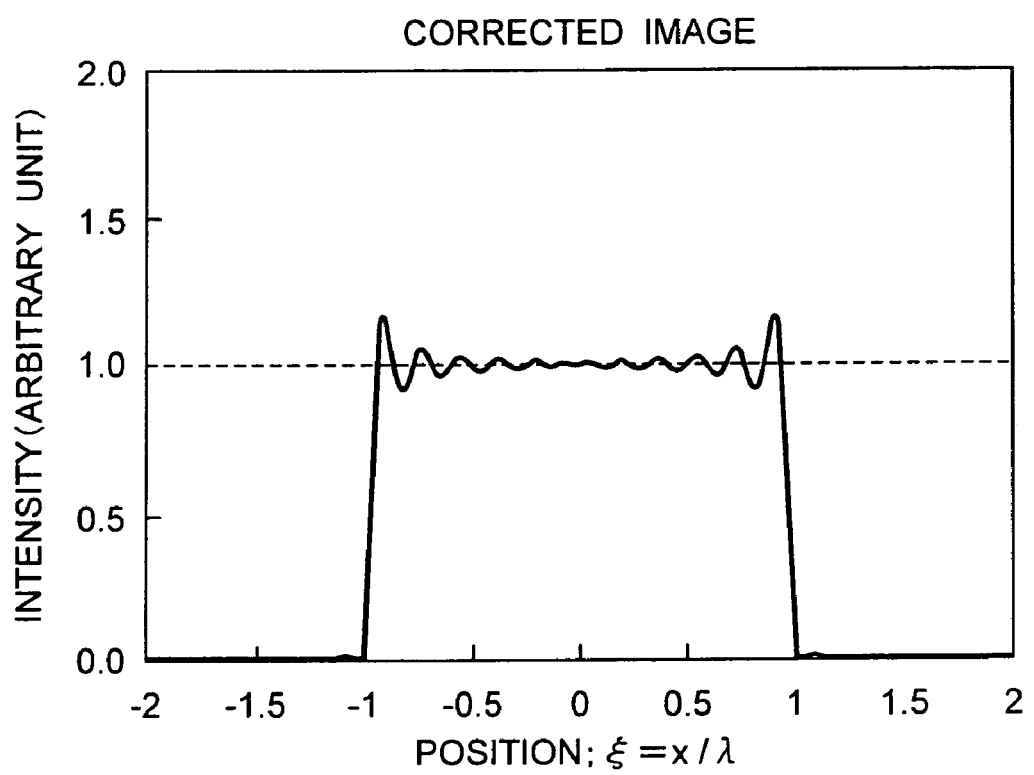
FIG. 7 is a diagram showing a restored intensity distribution obtained by compensating calculation (restoring)

FIG. 7 shows a restored intensity distribution $|f_{cmp}(\xi)|^2$ which is obtained by squaring the restored amplitude distribution $f_{cmp}(\xi)$ which is subjected to compensation calculation (restoring) in such manner.

However, for the convenience of numerical calculation, an integral shown in equation (15) was replaced by the sum, and a sum of up to a maximum integral number $N_c$ which satisfies $\Delta\kappa$=1 and $N_c\Delta\kappa>\kappa_c$ was taken. Here, $\kappa_c$ is a cut-off frequency. The cut-off frequency is defined as a frequency at which the value of the transfer function becomes 50%, or in other words, a frequency at which $|\tau(\kappa_c)|$=0.5.

A value of the transfer function which defines the cut-off frequency can be set to be an appropriate value by taking into consideration a measuring environment, and an accuracy of image detection which is sought. At this time, smaller the value which is set, of the transfer function which defines the cut-off frequency, the accuracy of image detection is more improved. However, when the value of the transfer function which defines the cut-off frequency is set to be small, an amount of calculation required for the transfer function compensation is increased.

Next, a reason why the restored intensity distribution shown in FIG. 7 does not coincide accurately with the original intensity distribution shown in FIG. 3 will be described below. The reason is that in the calculation process, the integral is replaced by the sum (numerical integration), and that instead of taking the infinite series, an upper limit of the sum is substituted by the cut-off frequency $\kappa_c$.

It can be noticed that as compared to an image $f_{img}(\xi)$ (FIG. 5) which is detected optically without performing the compensation processing, a result upon performing the compensation processing is much closer to the original amplitude distribution $f(\xi)$. Thus, even in a case in which the transfer function of the optical system exhibits the resonant enhancement as in FIG. 4 in a specific spatial frequency region, it is possible to compensate an image detected on the image plane, and to bring it closer to an image on the object plane.

Even when it is a specific region as the spatial frequency, considering that the abovementioned resonant enhancement disturbs the entire image, it is evident that an effect of the image detection method and the image detecting apparatus according to the present invention is a very significant.

Modified Embodiment

Figure 8:
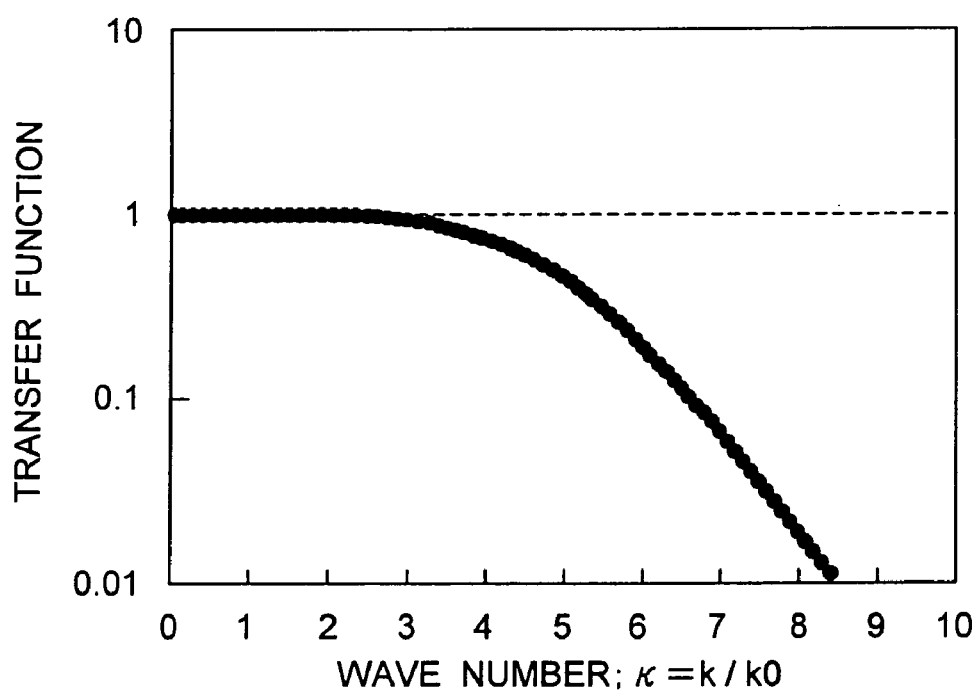
FIG. 8 is a diagram showing a transfer function in a case in which a specific frequency region is not let to have a resonant enhancement of the transfer function.
Figure 9:
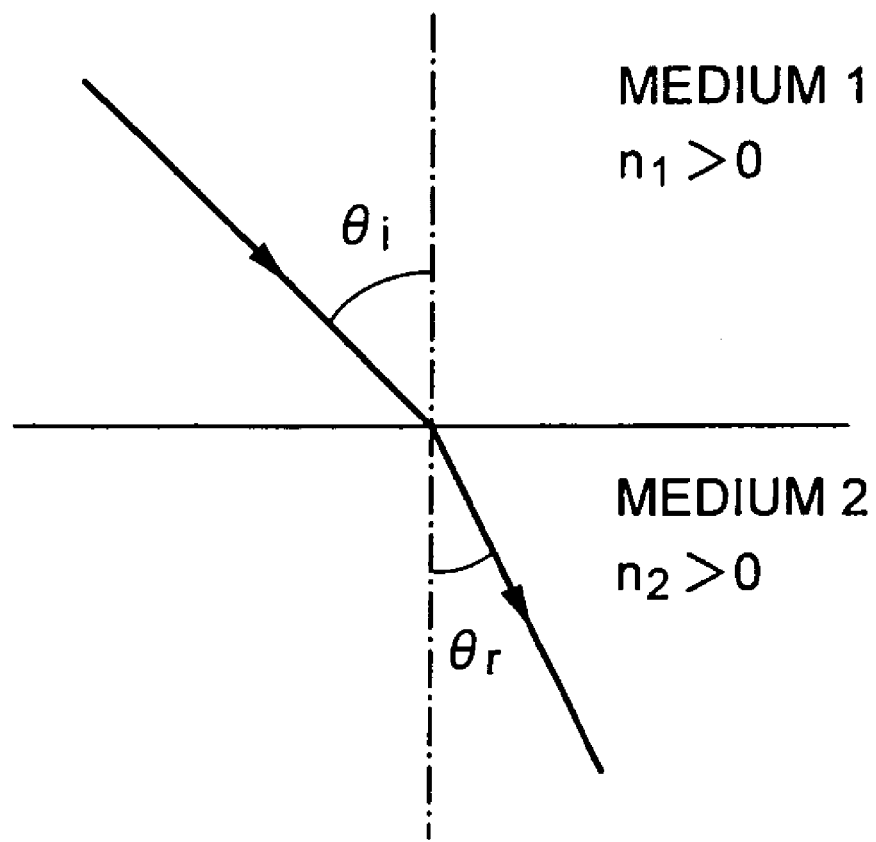
FIG. 9 is a diagram showing a refraction of light in a general optical system.
Figure 10:
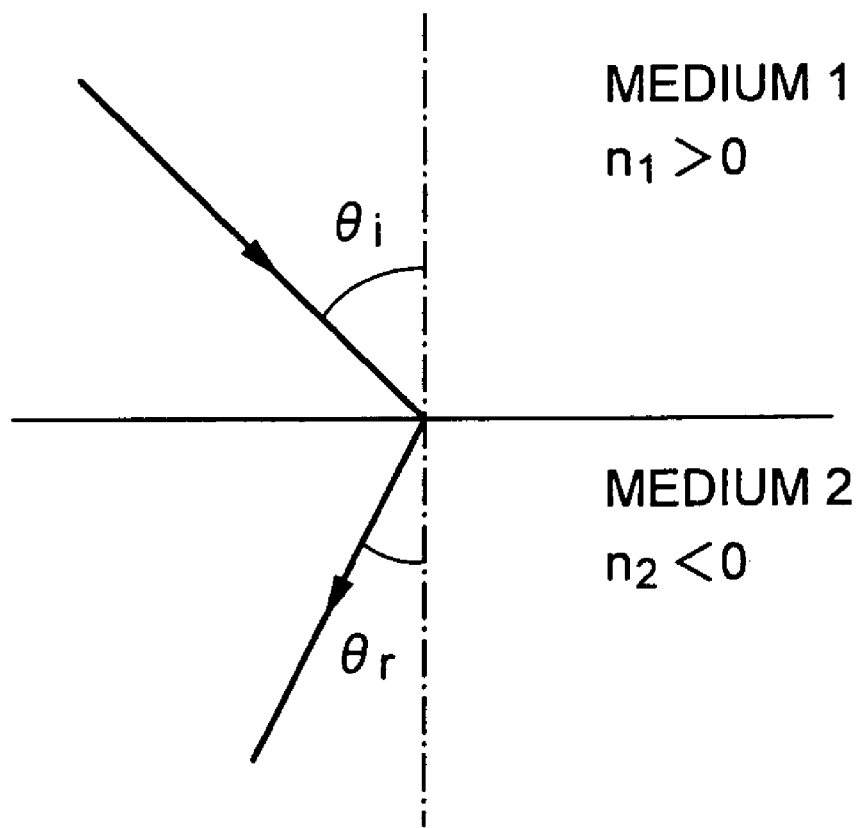
FIG. 10 is a diagram showing a refraction of light in a material having a negative refractive index.
Figure 11:
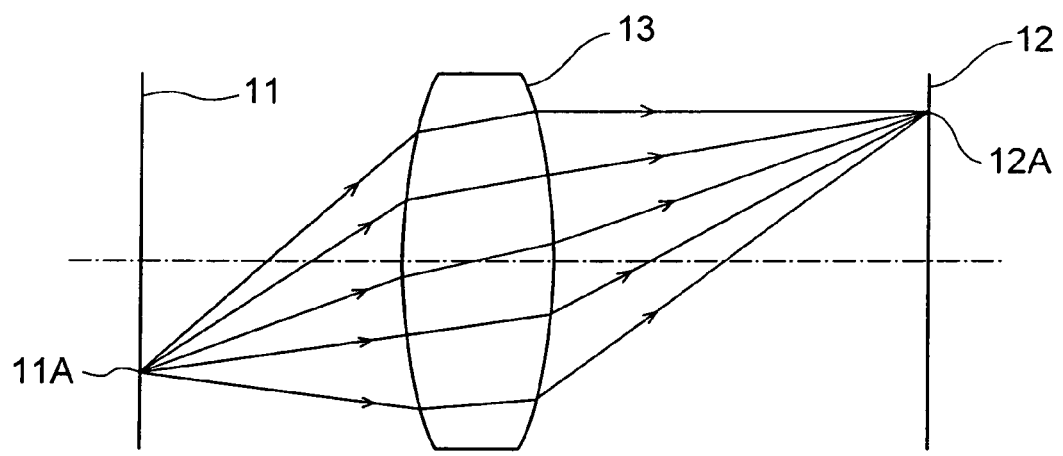
FIG. 11 is a diagram showing an image forming relationship by a convex lens in which a general optical material is used.
Figure 12:
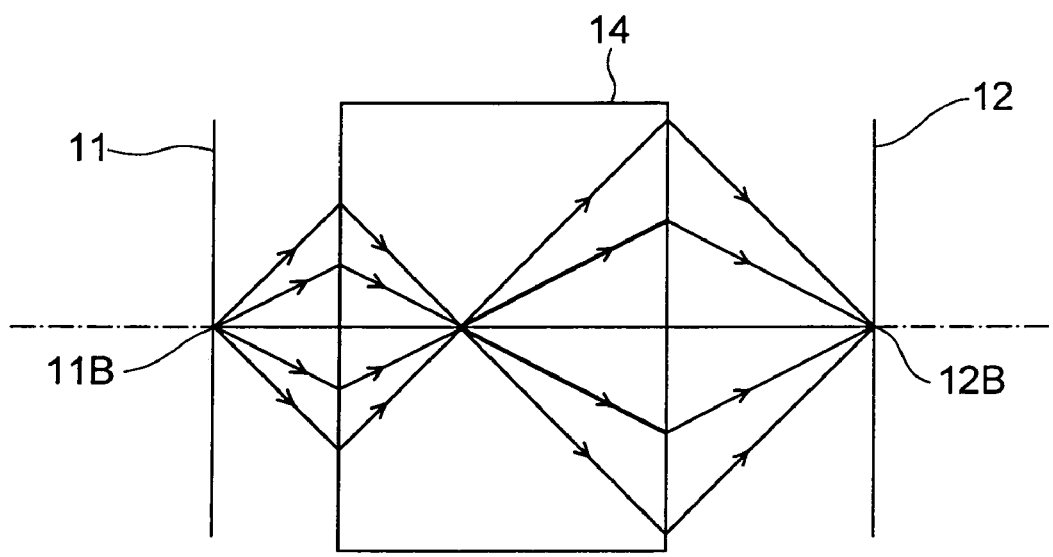
FIG. 12 is a diagram showing an image forming relationship by a negative refraction lens.

The effect of the present invention is not restricted to a case in which the transfer function of the optical system exhibits the resonant enhancement in the specific spatial frequency region. FIG. 8 shows a transfer function in a case in which there is no resonant enhancement of the transfer function in the specific spatial frequency region.

It shows that the transfer function starts decreasing from a region in which a value of a wave number $\kappa$ which is normalized is above 3, and minute information of about ⅓ of the wavelength can be transmitted.

A detailed computing process is not shown here. However, it is evident that by performing exactly the same calculation mentioned above in the same order, it is possible to restore an image closer to the original image, from the image detected at the image plane. In this case, due to an accuracy of transfer function data shown in FIG. 8, and the discrete interval of the numerical integral, sometimes the restoring capacity is constrained. However, as compared to raw image data at least in a state of being detected, it is possible to restore the image data closer to the original image data.

In the first embodiment, with the transfer characteristics peculiar to the optical system, at the calculation processing step, a calculation processing in which a value of a function exhibiting the transfer characteristics is substantially constant, in other words, the value brought closer to 1.0 which is the reference value, is performed. Particularly, the calculation processing in which the resonant enhancement (peak value) of the transfer function is brought near 1.0 which is an example of the reference value is performed.

In this modified embodiment, the transfer function does not have the resonant enhancement (peak value). However, in such a case, it is possible to improve the transfer characteristics by performing compensation processing such that a value of the transfer function of a high-frequency side where a wave number at which the value of the transfer function starts decreasing from the reference value (1.0 in this example), comes closer to the reference value.

Moreover, in the first embodiment, a flat negative refraction lens was used as the optical element made of a material exhibiting negative refraction. However, even when a convex lens, a concave lens, an inhomogeneous lens, a prism, a wavelength plate, a polarizing plate, an optical isolator, and a mirror etc. is used, it is possible to achieved the effect of the present invention. The optical element includes the convex lens, the concave lens, the inhomogeneous lens, the prism, the wavelength plate, the polarizing plate, the optical isolator, and the mirror etc.

For example, in Non-Patent Literature Physical Review E, volume 70, Page 065601 (2004), by D. Schurig et al., an example of making a convex lens and a concave lens by the negative refraction material is described. Moreover, in Non-Patent Literature Physical Review B, Volume 69, 115115 (2004), by S. A. Ramakrishna et al., a concept for achieving a perfect lens effect by using an inhomogeneous lens of a negative refraction material has been disclosed. It is needless to mention that a prism made of a material exhibiting negative refraction has a function similar as described in this specification. Moreover, it is also possible to realize a function of the wavelength plate, the polarizing plate, and the optical isolator by using photonic crystals (for example, Refer to Non-Patent Literature "Photonic Crystals" (Springer—Verlag, 2004) by K. Inoue et al.). Furthermore, even in a case in which a photonic band to which a frequency of electromagnetic waves to be used belongs is a band exhibiting negative refraction, having a function and effect similar as in the present invention can be easily imagined.

Second Embodiment

Next, an image detection method according to a second embodiment of the present invention will be described below. In the second embodiment, the compensation processing is performed by using a calculation different from the calculation in the first embodiment. Similarly as in the first embodiment, a complex amplitude distribution $f(\xi)$ of an image detected on the image plane and the Fourier transform $F(\kappa)$ thereof are defined as in the following equation (16) and equation (17).

$$f(\xi) = \int_{-\infty}^{\infty} F(\kappa)\exp(2\pi i\kappa\xi)d\kappa = FT^{-1}\{F(\kappa)\} \qquad \text{equation (16)}$$

$$F(\kappa) = \int_{-\infty}^{\infty} f(\xi)\exp(-2\pi i\kappa\xi)d\xi = FT\{f(\xi)\} \qquad \text{equation (17)}$$

FT and $FT^{-1}$ in equation (16) and equation (17) are terms by which the Fourier transform and a reverse Fourier transform are expressed by symbols. Moreover, for the transfer function $|\tau(\kappa)|$ from the object plane to the image plane via the negative refraction lens, a reciprocal $1/|\tau(\kappa)|$ and the function $f(\xi)$ are let to be the Fourier transform mutually.

In other words, the following equation (18) and equation (19) are established. Here, $f_{cmp}(\xi)$ is defined by equation (20). Symbol * indicates a convolution of two functions having $\xi$ as a variable. The convolution is expressed by equation (21) (refer to Non-Patent Literature Optics and Fourier transform, Published by Asakura Shoten, Tokyo, 1992, by T. Yatagai, for example)

$$t(\xi) = \int_{-\infty}^{\infty} \frac{1}{|\tau(\kappa)|}\exp(2\pi i\kappa\xi)d\kappa \qquad \text{equation (18)}$$

$$\frac{1}{|\tau(\kappa)|} = \int_{-\infty}^{\infty} t(\xi)\exp(-2\pi i\kappa\xi)d\xi \qquad \text{equation (19)}$$

-continued $$f_{cmp}(\xi) \equiv f(\xi) * t(\xi) \qquad \text{equation (20)}$$

$$f(\xi) * t(\xi) = \int_{-\infty}^{\infty} t(\xi')t(\xi - \xi')d\xi' \qquad \text{equation (21)}$$

Moreover, it is possible to calculate the Fourier transform of $f_{cmp}(\xi)$ according to the following equation (22).

$$\begin{aligned}
FT\{f_{cmp}(\xi)\} &= FT\left\{\int_{-\infty}^{\infty} f(\xi')t(\xi - \xi')d\xi'\right\} \qquad \text{equation (22)}\\
&= \int_{-\infty}^{\infty}\left\{\int_{-\infty}^{\infty} f(\xi')t(\xi - \xi')d\xi'\right\}\\
&\quad \exp(2\pi i\kappa\xi)d\xi\\
&= \int_{-\infty}^{\infty} d\xi' f(\xi')\int_{-\infty}^{\infty} d\xi t(\xi - \xi')\\
&\quad \exp\{2\pi i\kappa(\xi - \xi')\}\exp(2\pi i\kappa\xi')\\
&= \int_{-\infty}^{\infty} d\xi' f(\xi')\frac{1}{|\tau(\kappa)|}\exp(2\pi i\kappa\xi')\\
&= F(\kappa)\frac{1}{|\tau(\kappa)|}
\end{aligned}$$

From the above-mentioned results, it is possible to obtain immediately equation (23).

$$f_{cmp}(\xi) = f(\xi) * t(\xi) = FT^{-1}\left\{F(\kappa)\frac{1}{|\tau(\kappa)|}\right\} \qquad \text{equation (23)}$$

In other words, calculating the convolution of $f(\xi)$ and $t(\xi)$ is nothing else but calculating the inverse Fourier transform of $F(\kappa)/|\tau(\kappa)|$. In the first embodiment, $f(\xi)$ is subjected to the Fourier transform, and is subjected to the inverse Fourier transform upon dividing $F(\kappa)$ which is obtained, by $|\tau(\kappa)|$. Therefore, it is same as calculating according to equation (23).

Thus, as it has been described above, for performing the transfer function compensation, the complex amplitude distribution $f(\xi)$ of the detected image is not necessarily subjected to the Fourier transform, and the convolution of $f(\xi)$ and $t(\xi)$ may be calculated. For calculating $t(\xi)$, it is still necessary to perform the Fourier transform according to equation (18). However, the function $|\tau(\kappa)|$ or $t(\xi)$ is a function peculiar to the optical system. Therefore, in principle, the Fourier transform is to be calculated only once.

Whereas, $f(\xi)$ is a function which changes every time whenever the image is detected. When this fact is taken into consideration, it is realized that a transfer function compensation method in the second embodiment is a high speed method with less amount of calculation than in the first embodiment.

At the time of performing practically the transfer function compensation, steps such as a step of bringing an integral in proximity by summation, by digitizing (performing a discretization) a variable, a step of cutting off an upper limit of the sum at an appropriate range, and a step of converting the intensity distribution detected on the image plane to the amplitude distribution are necessary. A detailed procedure of these steps being similar to the procedure described in the first embodiment, the description of the procedure is omitted to avoid repetition.

Thus, as it has been described above, according to the present invention, it is possible to achieve image information closer to the original image information by compensating the image information which is transmitted via an optical system for which the transfer function characteristics are not favorable. Particularly, more substantial effect can be anticipated for an optical system which includes the resonant enhancement in the transfer function characteristics.

Ideal transfer function characteristics are those in which the value of the transfer function is 1 irrespective of the spatial frequency, and the transfer function characteristics are favorable means that a function form of the transfer function is closer to an ideal state.

Furthermore, in each of the embodiments described above, a term "light" is used for electromagnetic waves which carries an image formed. However, an effect of the present invention is not restricted to visible light only. Concretely, the same effect can be anticipated in general for electromagnetic waves including electric waves, radio waves, micro waves, infra red rays, ultraviolet rays, X-rays, and γ rays etc. In the embodiments also, there is no constraint whatsoever on a wavelength of the electromagnetic waves which carries the image formed. Therefore, in each embodiment, normalized wavelength is used. Thus, the present invention can have various modified embodiments which fall within the basic teachings herein set forth.

Thus, the image detection method according to the present invention is suitable for an optical system which includes an optical element which is formed by a material exhibiting negative refraction.

According to the image detection method of the present invention, there is shown an effect that it is possible to provide an image detection method in which an effect of the resonant enhancement of the evanescent waves is reduced in the optical system which includes the optical element formed of the material exhibiting negative refraction.

What is claimed is:

1. An image detection method comprising steps of:
   transferring image information in which, information of an object image on an object plane is transferred to an image plane via an optical system which includes an optical element formed by a material exhibiting negative refraction;
   detecting image in which, image-plane image information transferred to the image plane is detected optically; and
   calculation processing in which, for the image-plane image information which is detected, information of the object image is calculated by performing a calculation processing based on optical characteristics of the optical system.

2. The image detection method according to claim 1, wherein
   the optical characteristics of the optical system are functions peculiar to the optical system, indicating transfer characteristics from the object plane of the information of the object image up to the image plane, and with the transfer characteristics peculiar to the optical system, in the step of calculation processing, a calculation processing in which a value of a function exhibiting the transfer characteristics is substantially constant, is performed.

3. The image detection method according to one of claims 1 and 2, wherein
   in the step of calculation processing, a calculation processing in which a peak value of the function indicating the transfer characteristics is brought closer to a reference value, is performed.

4. The image detection method according to one of claims 1 and 2, wherein
   in the calculation processing step, a calculation processing in which a value of a function indicating the transfer characteristics on a side of a frequency higher than a predetermined spatial frequency is brought closer to a reference value, is performed.

5. The image detection method according to claim 2, wherein
   the function exhibiting the transfer characteristics is obtained by dividing an amplitude of the image-plane image information on the image plane by an amplitude of the information of the object image on the object plane.

6. The image detection method according to claim 2, wherein
   the function indicating the transfer characteristics is obtained by dividing an intensity of the image-plane image information on the image plane by an intensity of information of the object image on the object plane.

7. An image detecting apparatus comprising:
   an optical system which includes an optical element formed by a material exhibiting negative refraction;
   an imaging section which detects optically image-plane image information on the image plane of the optical system; and
   a calculation processing section which performs calculation processing of the image-plane image information which is detected by the imaging section, wherein
   the optical system transfers information of an object image on an object plane to an image plane, and
   the calculation processing section performs steps of
   transferring image information in which, information of the object image on the object plane is transferred to the image plane via the optical system which includes the optical element formed by the material exhibiting negative refraction,
   detecting image in which, the image-plane image information transferred to the image plane is detected optically, and
   calculation processing in which, for the image-plane information which is detected, information of the object image is calculated by performing a calculation processing based on optical characteristics of the optical system.

* * * * *